United States Patent
Jindal et al.

(10) Patent No.: US 8,122,377 B2
(45) Date of Patent: Feb. 21, 2012

(54) PRESERVING USER INTERFACE CUSTOMIZATIONS WHILE UPGRADING AN ENTERPRISE APPLICATION

(75) Inventors: Bharat Jindal, San Francisco, CA (US); Vipul Shroff, Sunnyvale, CA (US); Atul Suklikar, San Carlos, CA (US); Dejia Wang, San Mateo, CA (US); Ming Lam, San Mateo, CA (US); Victor Tao, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1197 days.

(21) Appl. No.: 10/880,967

(22) Filed: Jun. 30, 2004

(65) Prior Publication Data

US 2005/0203975 A1    Sep. 15, 2005

Related U.S. Application Data

(60) Provisional application No. 60/551,535, filed on Mar. 9, 2004.

(51) Int. Cl.
*G06F 3/048* (2006.01)

(52) U.S. Cl. ......... 715/826; 715/765; 715/744; 717/170

(58) Field of Classification Search ............... 707/204, 707/616; 715/826, 765, 744; 717/170, 116
See application file for complete search history.

(56) References Cited

U.S. PATENT DOCUMENTS

| | | | | |
|---|---|---|---|---|
| 5,581,755 A | * | 12/1996 | Koerber et al. | 1/1 |
| 5,845,128 A | * | 12/1998 | Noble et al. | 717/170 |
| 6,367,077 B1 | * | 4/2002 | Brodersen et al. | 717/170 |
| 6,553,563 B2 | * | 4/2003 | Ambrose et al. | 717/116 |

* cited by examiner

*Primary Examiner* — William Bashore
*Assistant Examiner* — Sherrod Keaton
(74) *Attorney, Agent, or Firm* — Campbell Stephenson LLP

(57) ABSTRACT

In an embodiment, a system for preserving user interface customizations while upgrading an enterprise application is provided. The system preserves customizations by identifying customizations made to user interface ("UI") objects of an enterprise application, and enabling these UI customizations to function with a newer version of the enterprise application. The system transforms UI customizations so that the transformed UI customizations function with a new UI model. By enabling a portion of an enterprise application to be upgraded while preserving UI customizations, the system dramatically reduces the time and cost incurred by companies when they upgrade enterprise software.

41 Claims, 8 Drawing Sheets

US 8,122,377 B2

PRESERVING USER INTERFACE CUSTOMIZATIONS WHILE UPGRADING AN ENTERPRISE APPLICATION

CROSS-REFERENCE TO RELATED APPLICATION(S)

This application claims the benefit of U.S. Provisional Application No. 60/551,535, filed on Mar. 9, 2004, which is herein incorporated in its entirety by reference.

TECHNICAL FIELD

The technology disclosed herein relates generally to enterprise applications and, more particularly, to preserving user interface customizations while upgrading enterprise applications.

BACKGROUND

Enterprise applications are typically large software applications that are used by many customers or users, such as employees of a business. These applications usually have multiple components that interact with one another and with other systems to perform various tasks. Enterprise applications include, e.g., enterprise resource planning, customer relationship management, and electronic messaging systems.

While the enterprise applications may offer a host of functionality, businesses using these applications sometimes need to customize the enterprise applications. As an example, a business may add or modify components to perform or validate the rules of the business. As another example, the business may add or modify user interface ("UI") components to implement a look and feel that may be unique to the business. Administrators may expend considerable effort in customizing the UIs, testing their customizations, training users, developing user manuals, and performing other activities relating to the enterprise applications and their customizations.

Vendors of enterprise applications sometimes upgrade the enterprise applications. Such upgrades may be necessitated by, e.g., addition of important functionality requested by the business, resolution of defects in the enterprise applications, addition of new features that may be valuable to several customers of the vendor, and a variety of other reasons.

Enterprise applications may comprise multiple repositories. As an example, an enterprise application may comprise a repository of components delivered by a vendor and a repository of components added by a business. Repositories comprise components of an enterprise application. As an example, a repository may contain UI or logic components of an enterprise application. When administrators upgrade the enterprise application, they may need to again expend considerable resources in reapplying their customizations, which could increase the total cost of ownership of such enterprise applications. It would thus be desirable to upgrade enterprise applications without incurring such additional costs.

DETAILED DESCRIPTION

Figure 1:
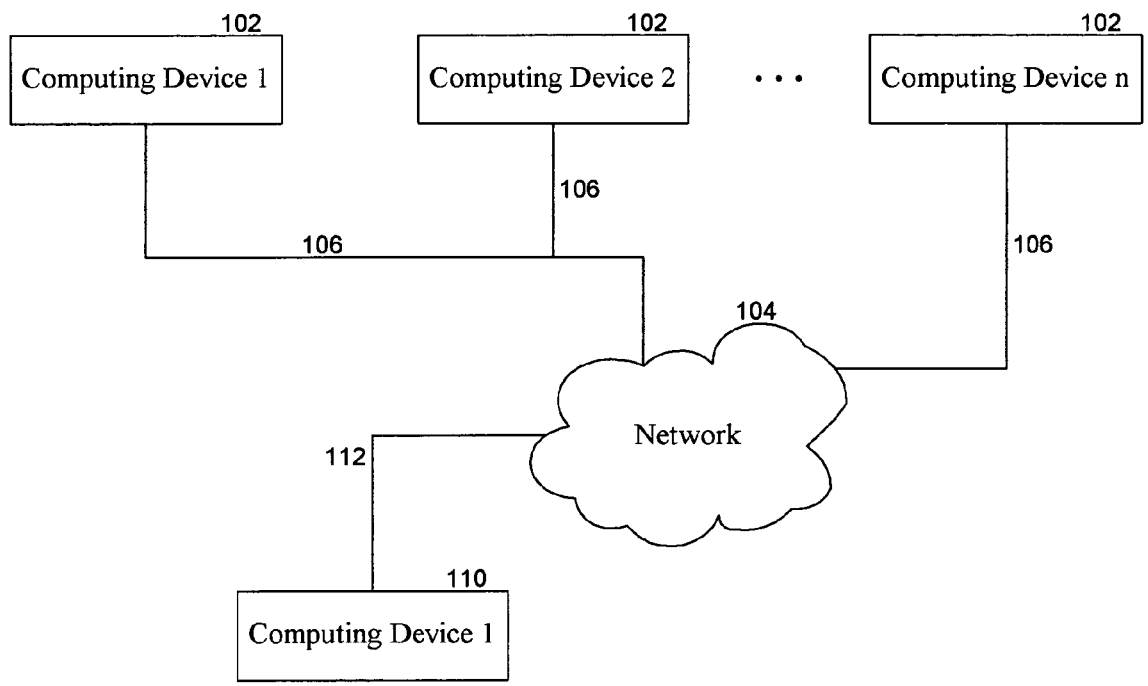
FIG. 1 is a block diagram illustrating an embodiment of the system for preserving customizations when upgrading an enterprise application.

In an embodiment, a system for preserving user interface customizations while upgrading an enterprise application is provided. The system preserves customizations by identifying customizations made to UI objects ("UI customizations") or elements of an enterprise application, and enabling these UI customizations to function with a newer version of the enterprise application. The system creates a list of UI customizations by comparing a present state of a repository of UI objects with the repository as delivered by the enterprise application vendor ("original repository"). The system creates a list of changes in a new repository by comparing the new repository with the original repository. The system then copies the UI customizations, as determined from the created list, to the new repository.

This copy in the new repository may contain UI customizations and not updates to UI objects distributed by the enterprise application vendor conflicting with updated UI objects. Because the enterprise application vendor may have updated an underlying UI model used by the UI customizations, the copied objects may not function correctly. As a result, the system transforms the UI customizations in the new repository so that the transformed UI customizations function with the new UI model. If a transformation is not possible, rules may be applied to determine how to handle such objects. As an example, an administrator may be notified of the problematic customizations. Administrators may also be able to select whether UI objects transformed by the system or delivered by the enterprise application vendor are to be used for a particular screen, application, or other software component.

The disclosed system dramatically reduces the time and cost incurred by companies when they upgrade enterprise software by minimizing additional effort required to apply customizations to new releases of the enterprise software. The system also enables administrators of such software to update aspects of the enterprise applications other than the UI, and selectively apply updates to the UI at a suitable time. As an example, an administrator may elect to update logic-related aspects of an enterprise application to benefit from bug fixes, improved performance, or other improvements implemented by the supplier of the enterprise application. The administrator may choose to maintain UI customizations relating to the enterprise application, or "roll out" changes over time as training and user documentation is completed. Alternatively, administrators may choose to test whether their UI customizations are compatible with a newer version of the enterprise software before updating the UI objects. Thus, the system enables administrators to retain UI customizations made to UIs so that a UI designed to function with a prior version of enterprise application logic continues to function with new enterprise application logic. The system may, e.g., enable a business to preserve UI customizations made to an enterprise application when upgrading the enterprise application. As an example, the system may preserve layout customizations by incorporating the layout customizations in the upgraded version of the enterprise application.

Figures

Turning now to the figures, FIG. 1 is a block diagram illustrating an embodiment of the system for preserving UI customizations when upgrading an enterprise application. The system may comprise multiple computing devices 102, a network 104, and a computing device 110. The computing devices 102 may be coupled to the network 104 via data communications links 106. The communication links 106 may be, e.g., a part of an intranet (not shown). The intranet may be coupled to a network 104, such as the Internet. The computing device 110 may be a device that is not a part of the intranet of computing devices 102. The computing device 110 may be coupled to the network 104 via a data communications link 112. In an embodiment, the network 104 may be an intranet. The various computing devices may be used to provide identical or different functions. As an example, a computing device may function as a client that uses a repository of data stored on another computing device that functions as a server. The computing devices may change roles.

In an embodiment, a client computing device, such as a computing device 102, may retrieve information from a server computing device, such as computing device 110, relating to an upgrade the client computing device is to perform on an enterprise application. Alternatively, information relating to the upgrade may be delivered to a customer via other portable means, such as on any form of electronic media including, e.g., DVD-ROM, CD-ROM, etc.

Figure 2:
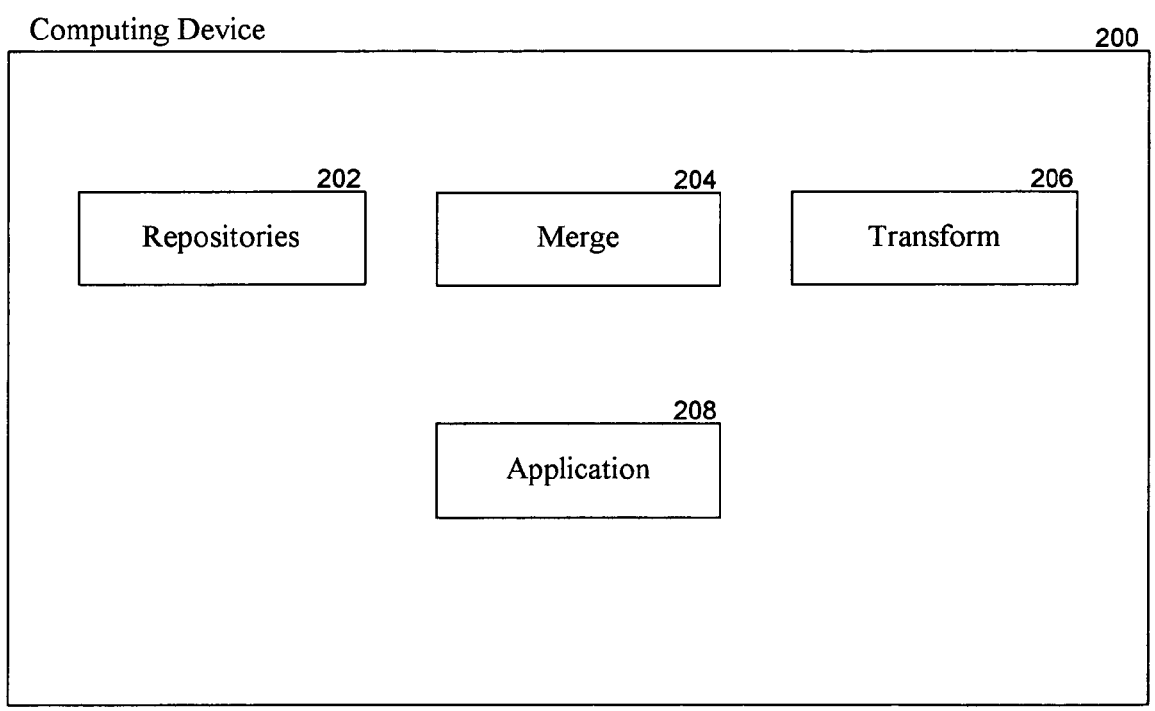
FIG. 2 is a block diagram illustrating an embodiment of a computing device of FIG. 1.

FIG. 2 is a block diagram illustrating an embodiment of a computing device of FIG. 1. The illustrated computing device 200 comprises multiple components. A repositories component 202 comprises multiple repositories that each contain various objects including, e.g., code components, of the system, and are further described below in greater detail. A merge component 204 performs merge operations on objects of a repository. An example of a merge operation may include creating a UI screen containing three input text boxes as a result of merging a UI screen containing one input text box with a UI screen containing two input text boxes. A transform component 206 performs transformations on objects of a repository. An example of a transformation may include transforming a component that uses a method of an application program interface to use another method of the application program interface. Transformation of customized UI objects is further described below in relation to FIG. 8. An application component 208 comprises multiple components that may interact with components of repositories to provide an enterprise application.

Figure 3:
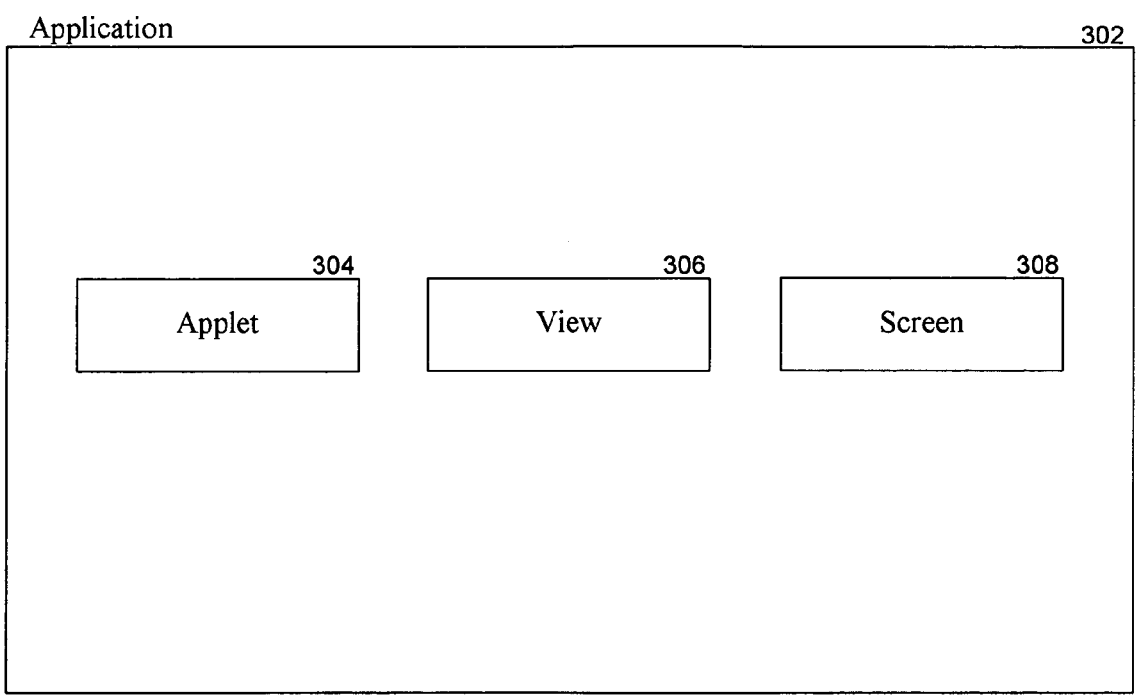
FIG. 3 is a block diagram illustrating an embodiment of an application of FIG. 2.

FIG. 3 is a block diagram illustrating an embodiment of an application of FIG. 2. The application 302 comprises an applet component 304, a view component 306, and a screen component 308. The application may further comprise additional components, such as business logic components (not shown).

The applet component may comprise multiple applets that each are visual representations of underlying business objects, and are associated with the enterprise application. As an example, an applet may present a list box populated with text from a database. As another example, an applet may display a chart based on data stored in a database. Applets may be created and managed using tools, such as a comprehensive multi-user application customization environment that exploits a visual programming UI.

The view component may comprise multiple views that each identify applets and their relationships that together present or collect information. As an example, a view may present an "opportunity" applet and a "contacts" applet. The opportunity applet may enable a user to select an opportunity available to the user (e.g., potential customer X, potential customer Y, etc.). The contacts applet may enable a user to view contact information (e.g., name, telephone number, electronic mail address, etc.). When an opportunity applet and a contacts applet are jointly identified for a view along with their relationship, the system may cause the contacts applet to be populated or refreshed when the user selects an opportunity. As an example, when the user selects potential customer X, the contacts applet may display contacts associated with potential customer X.

The screen component may comprise multiple screens that identify and collate multiple views. As an example, a marketing screen may comprise three views corresponding to contact information, news information, and order history of a customer. Each view may comprise multiple applets, as described above.

Figure 4:
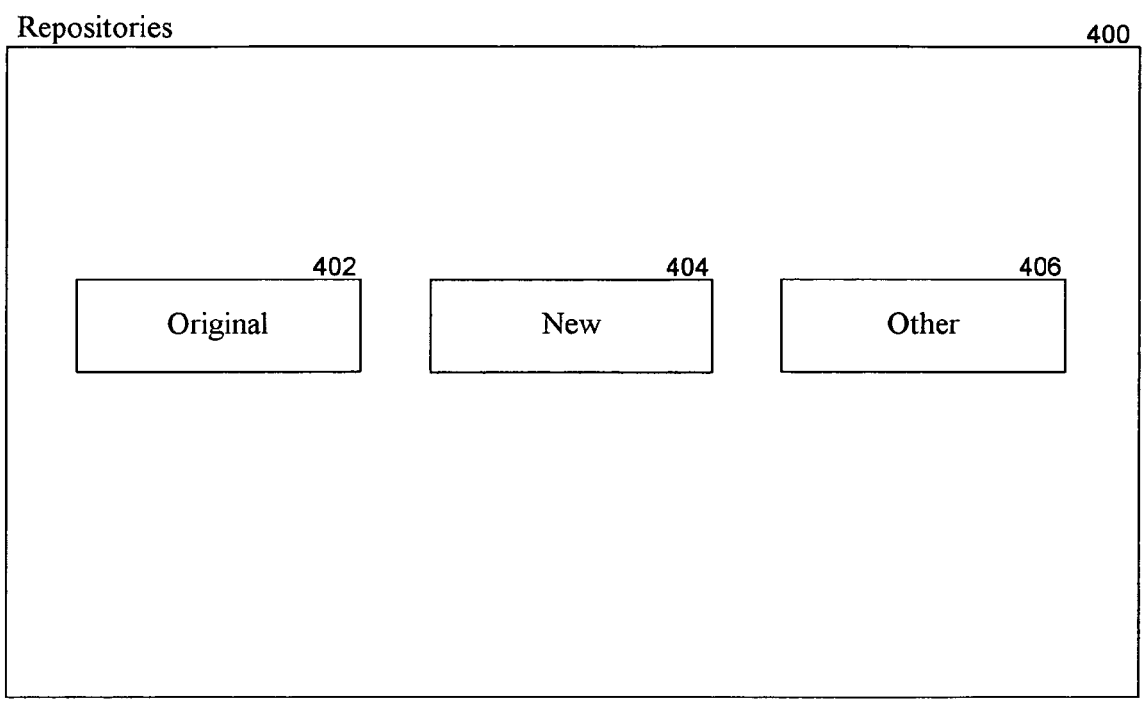
FIG. 4 is a block diagram illustrating an embodiment of a repositories component of FIG. 2.

FIG. 4 is a block diagram illustrating an embodiment of a repositories component of FIG. 2. The repositories component 400 comprises an original repository 402, a new repository 404, and an other repository 406, such as a repository containing a customer's customizations. These repositories may be used during merge and transformation operations while upgrading an enterprise application. The repositories may contain aspects of enterprise applications, such as logic, text, UI objects, and, more generally, any aspect of a software application that can be represented electronically. As an example, the original repository may contain objects relating to an enterprise application delivered before an upgrade, the new repository may contain objects relating to the enterprise application delivered as a part of the upgrade, and the other repository may objects customized or built by a customer.

Figure 5:
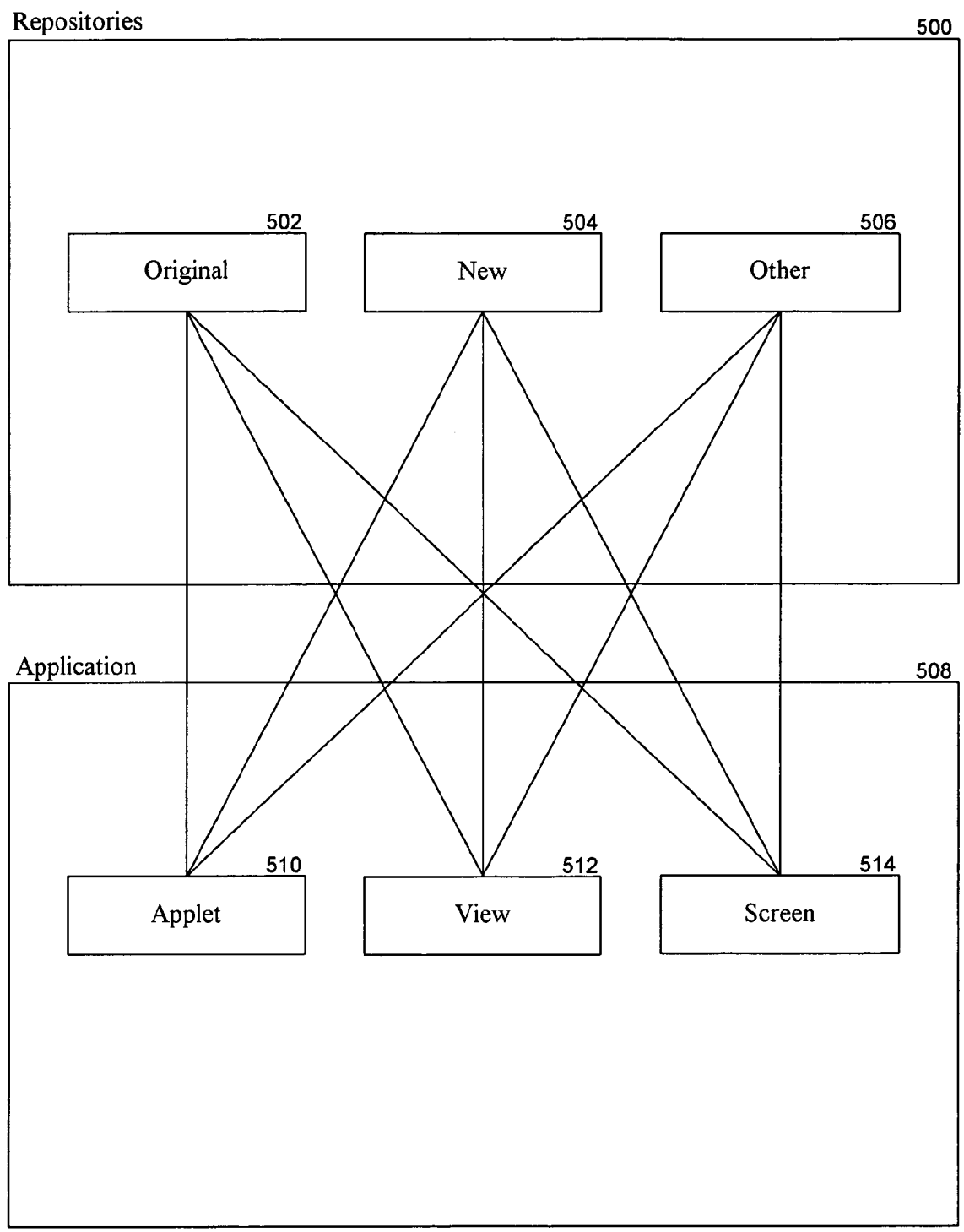
FIG. 5 is a block diagram illustrating interactions between components of the system for preserving customizations when upgrading an enterprise application in an embodiment.

FIG. 5 is a block diagram illustrating interactions between components of the system for preserving UI customizations while upgrading an enterprise application in an embodiment. Components of a repositories component 500 interact with components of an application component 508. Specifically, applet component 510, view component 512, and screen component 514 each interact with original repository 502, new repository 504, and other repository 506 to provide an enterprise application. As an example, when the enterprise application is defined by components originally delivered by the vendor of the enterprise application, components newly delivered by the vendor, and customizations made by the business, the enterprise application may be defined by the illustrated interactions. These interactions are illustrated using lines connecting all the illustrated components. An interaction may involve using an object of a repository. As an example, an enterprise application may comprise applets from several repositories.

In an embodiment, the interactions between the application's components may only be with a single repository that contains some objects from some of the other repositories illustrated. As an example, a "merged and transformed" repository (not shown) may contain some objects from each of the original repository, new repository, and other repository, and the application's components may interact only with the merged and transformed repository.

Figure 6:
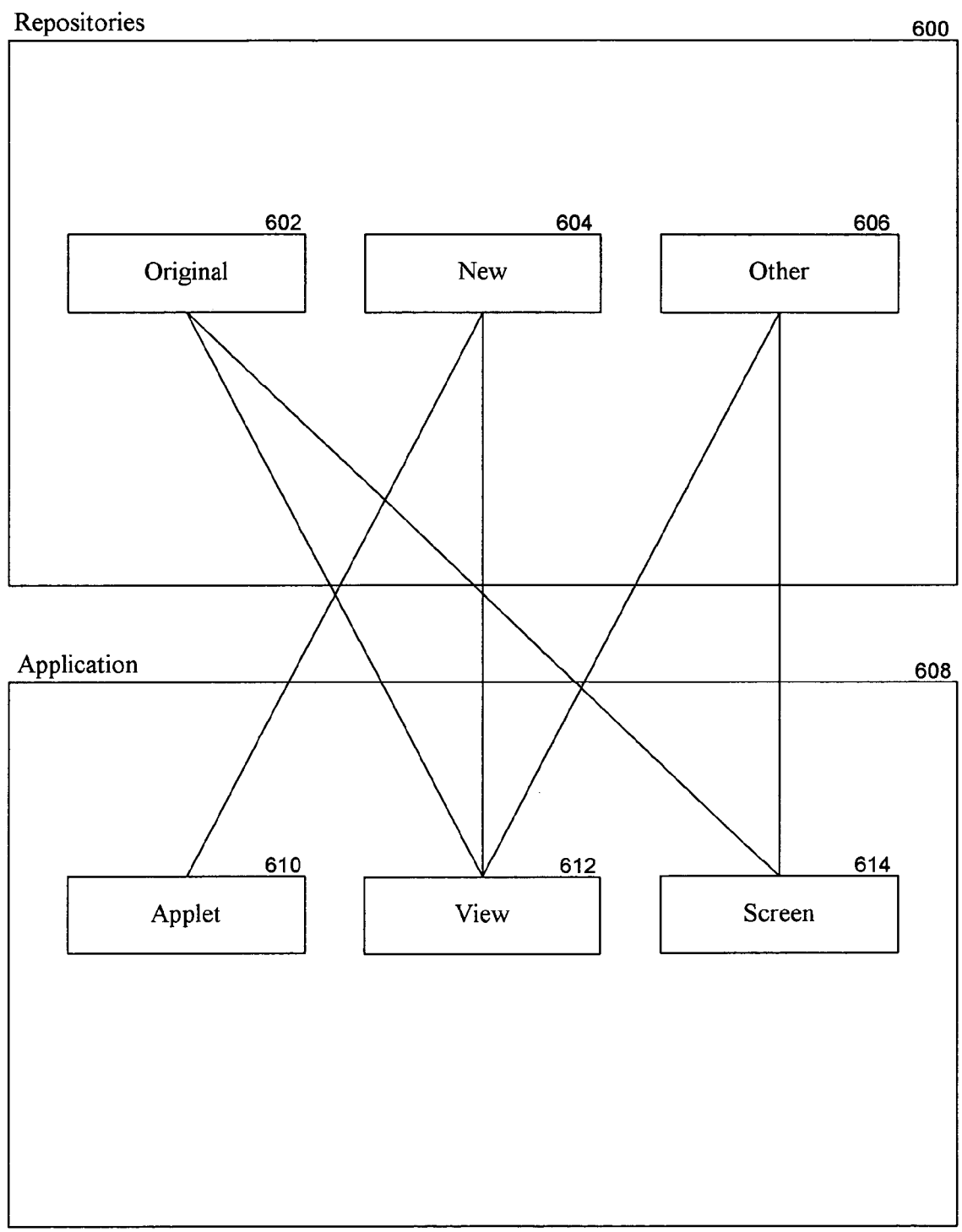
FIG. 6 is a block diagram illustrating interactions between components of the system for preserving customizations when upgrading an enterprise application in an embodiment.

FIG. 6 is a block diagram illustrating interactions between components of the system for preserving customizations when upgrading an enterprise application in an embodiment. In the illustrated embodiment, an enterprise application is defined by applets that are newly delivered by a vendor of the enterprise application, screens that were both originally delivered by the vendor and customized by the business, and views that were originally delivered by the vendor, newly delivered by the vendor, and customized by the business. These interactions are illustrated using lines connecting the various illustrated components. Specifically, applet component 610 has interactions with new repository 604. View component 612 has interactions with original repository 602, new repository 604, and other repository 606. Screen component 614 has interactions with original repository 602 and other repository 606.

In an embodiment, the interactions between the application's components may only be with a single repository that contains some objects from some of the other repositories illustrated. As an example, a "merged and transformed" repository (not shown) may contain objects that could be used by the enterprise application from each of the original repository, new repository, and other repository. I.e., the merged and transformed repository may contain objects that will be used by the enterprise application after it has been upgraded. The enterprise application's components may interact only with the merged and transformed repository.

Figure 7:
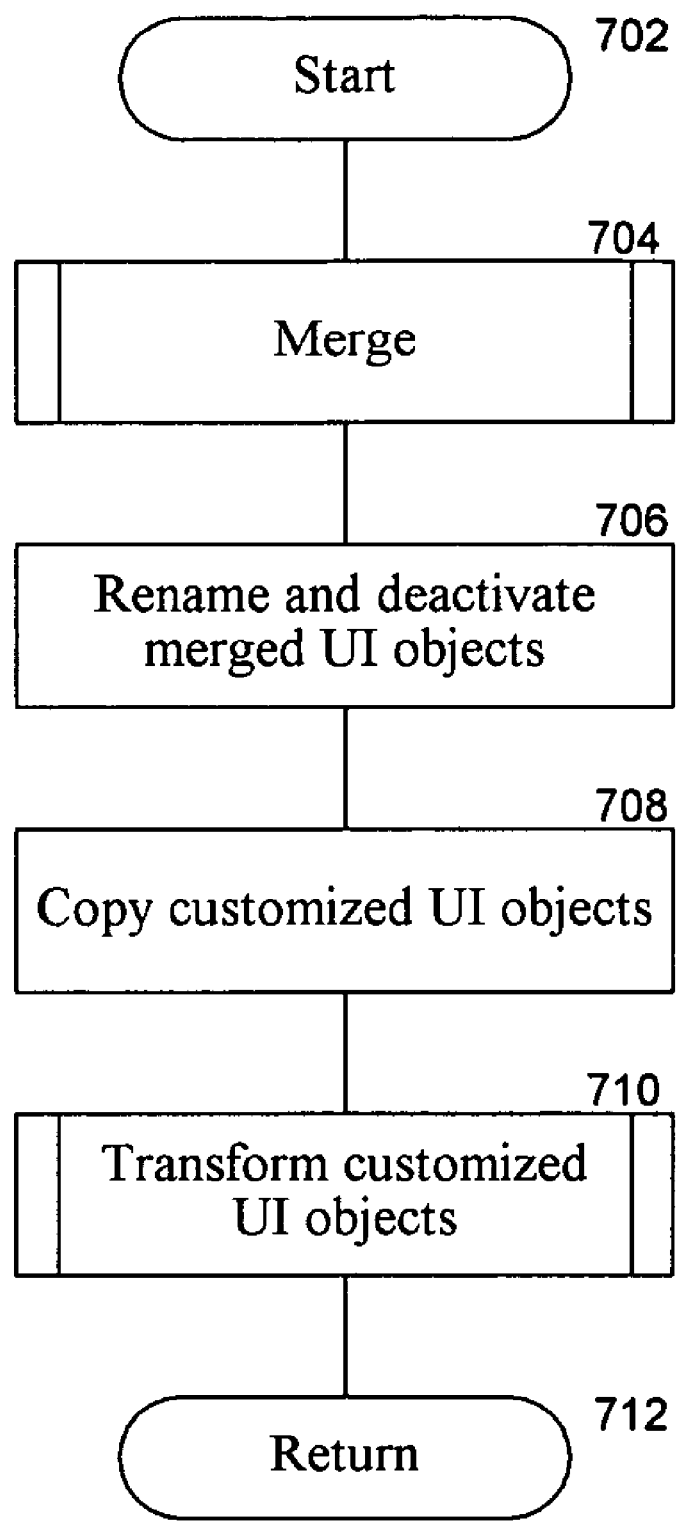
FIG. 7 is a flow diagram illustrating an embodiment of a routine for preserving user customizations.

FIG. 7 is a flow diagram illustrating an embodiment of a routine for preserving UI customizations during an upgrade. Before the routine is performed, an administrator may request the system to perform a pre-merge operation to identify all UI objects the enterprise application uses (not shown). The pre-merge operation identifies all UI objects in use by analyzing all components of the enterprise application including, e.g., applets, views, and screens. The pre-merge operation may then identify all such UI objects for the administrator. The pre-merge operation may also then receive indications from the administrator relating to which UI objects to preserve (i.e., not replace with newer components distributed by the vendor of the enterprise application upgrade). As an example, a "wizard"-like UI may be provided for the administrator to indicate the UI objects to be preserved. Alternatively, a list of UI objects may be presented to the administrator (e.g., in an "object list"), from which the administrator can select UI objects to be preserved. Alternatively, a list of applications may be presented to the administrator, from which the administrator may select enterprise applications that are being used, and the routine may automatically select customized UI objects to preserve from the used enterprise applications. Upon completing this pre-merge operation, the system may begin performing the illustrated routine.

The routine begins at block 702. At block 704, the routine calls a subroutine to perform a three-way merge of a prior release of an enterprise application repository, a customer's customizations of the repository, and a new version of the repository. The merge subroutine creates a repository containing objects of all three repositories. The merge may result in conflicts. As an example, when multiple objects with identical attributes (e.g., names, unique identifiers, or other identifiers used for objects) are found, a conflict results. When a conflict results, the routine may identify the conflicts for resolution by an administrator. The routine may resolve conflicts as indicated by the administrator. As an example, the routine may select an object indicated by the administrator to be preferable or compatible with the enterprise application.

At block 706, the routine renames and deactivates merged UI objects previously indicated as needing to be preserved. The merged repository contains objects from a prior release of an enterprise application repository, a customer's customizations of the repository, and a new version of the repository. However, for UI objects indicated by the administrator to be preserved, the system may not need the associated objects from the enterprise application repository or the new version of the repository. By renaming and deactivating the UI objects, the UI objects may not be capable of being used by the enterprise application.

At block 708, the routine copies customized UI objects from the repository containing the customer's customizations into the new repository. By performing this step, the customized UI objects may continue to be used by the enterprise application. As an example, when code in the enterprise application instantiates or references a particular customized UI object, the customized UI object will continue to be used instead of a replacement UI object delivered by the vendor.

At block 710, for each copied customized UI object, the routine calls a subroutine to transform customized UI objects in the new repository. Transformation may need to be performed because, e.g., an object copied at block 708 may reference an outdated UI or logic object, or may call a method of an application program interface that has been modified or removed. The routine passes an indication of the customized UI object to the transform subroutine. The transform subroutine is further described below in relation to FIG. 8. At block 712, the routine returns to its caller.

Figure 8:
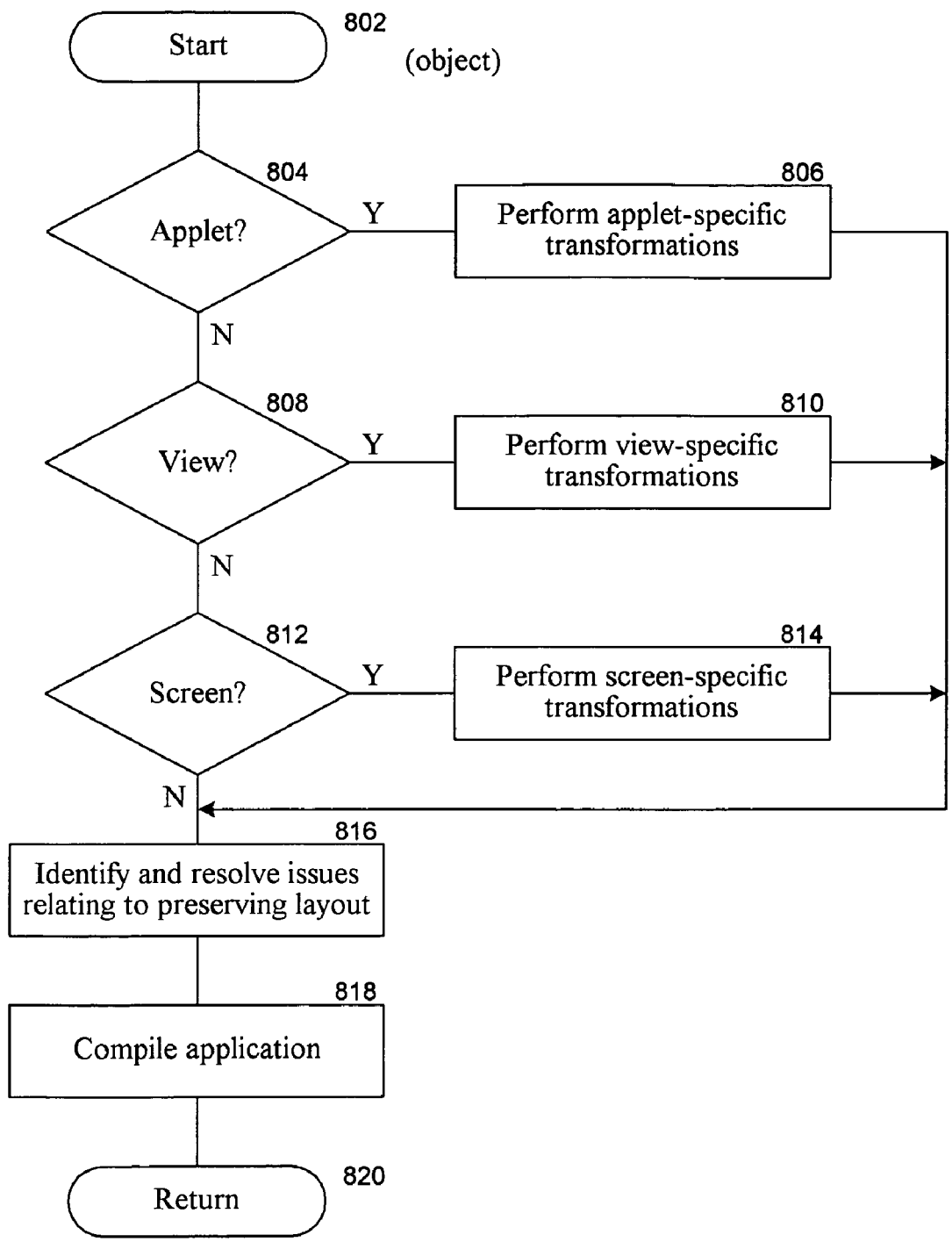
FIG. 8 is a flow diagram illustrating an embodiment of a subroutine for transforming customized objects.

FIG. 8 is a flow diagram illustrating an embodiment of a subroutine for transforming customized objects. The subroutine performs applet-, view-, and screen-specific transformations to customized UI objects. The subroutine begins at block 802 where it receives an indication of a customized UI object as a parameter.

At block 804, the subroutine determines whether the customized UI object is an applet. If so, the subroutine continues at block 806. Otherwise, the subroutine continues at block 808.

At block 806, the subroutine performs applet-specific transformations. Applet-specific transformations may include, e.g., modifying attributes of applets such as position, size, data source, etc. These transformations may be performed to ensure that the applet continues to function with other changes incorporated into the enterprise application, such as use of a grid for providing values instead of text boxes positioned in a view. As an example, a customized applet may reference a position relative to a window (e.g., top left of a view). When an updated view uses a grid for collecting or presenting user input rather than text boxes in a view, applets referencing a position may malfunction. To prevent this malfunction, the transformation may involve converting a positional reference to a grid reference. The subroutine then continues at block 816.

At block 808, the subroutine determines whether the customized UI object is a view. If so, the subroutine continues at block 810. Otherwise, the subroutine continues at block 812.

At block 810, the subroutine performs view-specific transformations. View-specific transformations may include, e.g., modifying attributes of views such as position, size, background, etc. These transformations may be performed to ensure that the view continues to function with other changes incorporated into the enterprise application, such as to ensure that a look and feel defined by a template are carried into the view. The subroutine then continues at block 816.

In an embodiment, view-specific transformations may include creating hierarchical data structures comprising categorized views for views delivered by the vendor and views created by the customer. The hierarchical data structure may be used to categorize views. When a view cannot be categorized (as may be the case for customized views), the subroutine may attempt to determine a category for the view based on the view's meta properties. As an example, a view referencing a contact-related applet may be categorized as a contact-related view. The subroutine may then merge the hierarchical data structures, wherein the merging includes placing nodes of all hierarchical data structures as descendant nodes of corresponding parents of the merged data structure. As an example, if node B is a child of node A in data structure 1, and node C is a child of node A in data structure 2, then node A will have as children nodes B and C in the merged data structure. The merged data structure is then stored in a database. Subsequent use of views may use this categorization.

At block 812, the subroutine determines whether the customized UI object is a screen. If so, the subroutine continues at block 814. Otherwise, the subroutine continues at block 816. At block 814, the subroutine performs screen-specific transformations. Screen-specific transformations may include modifying attributes of screens such as position, size, background, etc. These transformations may be performed to ensure that the screen continues to function with other changes incorporated into the enterprise application, such as to ensure that a look and feel defined by a template are carried into the screen. The subroutine then continues at block 816.

In an embodiment, the subroutine may perform some but not all of the transformations. As an example, only view and applet transformations may be performed.

At block 816, the subroutine identifies and resolves issues that may arise relating to the transformation including, e.g., checking if fields are mapped, checking to see if references are valid, etc. If the subroutine is unable to resolve such issues, the subroutine may flag such problems for an administrator to handle. Alternatively, the subroutine may attempt to resolve the problems itself based on various rules. The rules may be specified by the enterprise application vendor, customer, administrator, or others. The rules may include an indication to, e.g., always preserve the customer's customizations.

At block 818, the subroutine compiles the application, at which point the upgrade process may be complete. The administrator may then run and visually verify the new application, and may then selectively apply new UI objects. At block 820, the subroutine returns to its caller.

The result of the upgrade process is an upgraded version of the application that incorporates the features of the new release with customizations made to the prior release by the customer or others.

Application Program Interface

The system may expose an application program interface ("API") relating to its components. The API may expose methods, properties, and events, which may be categorized into various classes. An upgrade preparation class may comprise methods, properties, and events for constructing and using hierarchical data structures for views and screens. A grid preparation class may comprise methods, properties, and events for transforming applets to use a grid. An applet patch class may comprise methods, properties, and events for transforming applets to use new objects delivered by the vendor of the enterprise application.

From the foregoing, it will be appreciated that specific embodiments of the invention have been described herein for purposes of illustration, but that various modifications may be made without deviating from the spirit and scope of the invention.

We claim:

1. A method performed by a computing system, comprising:
preserving a customized object while upgrading an enterprise application to an upgraded enterprise application, comprising
merging a plurality of repositories into a merged repository, wherein
the plurality of repositories comprises
a customized repository,
an original repository, and
an upgraded repository,
the customized repository comprises the customized object,
the original repository comprises an original object,
the customized object is produced by applying one or more customizations to the original object, and
the upgraded repository comprises an upgraded object;
identifying the customized object for preservation, wherein
the customized object is preserved, while the enterprise application is upgraded, by retaining the customized object in the merged repository; and
transforming the customized object, wherein
the transforming enables the customized object to operate with the upgraded enterprise application without reapplying the one or more customizations,
the transforming comprises
determining a type of the customized object,
performing a transformational function based on the type,
identifying an updated method in the upgraded object, and
replacing an original method call in the customized object with an updated method call,
the replacing results in the customized object being configured to make a method call to the updated method instead of an original method,
the original method call is a method call to the original method, and
the updated method call is a method call to the updated method.

2. The method of claim 1, wherein the identifying the customized object comprises:
analyzing objects in the plurality of repositories.

3. The method of claim 1, wherein the identifying the customized object comprises:
analyzing objects in the merged repository.

4. The method of claim 1, wherein the transforming comprises:
identifying and resolving issues relating to the transformation.

5. The method of claim 4, wherein the type is an applet.

6. The method of claim 5, wherein the transformational function enables the applet to function in a grid.

7. The method of claim 4, wherein the type is a view.

8. The method of claim 7, wherein the transformational function creates a categorization for views.

9. The method of claim 4, wherein the type is a screen.

10. The method of claim 1, wherein the identifying comprises:
comparing a present state of an object with a state of the object as delivered by a vendor of the object.

11. A system comprising a computer-readable storage medium, and computer-executable instructions encoded on said computer-readable storage medium and configured to:
preserve a customized object while upgrading an enterprise application to an upgraded enterprise application, wherein the computer-executable instructions encoded to preserve are further configured to
merge a plurality of repositories into a merged repository, wherein the plurality of repositories comprises
a customized repository,
an original repository, and
an upgraded repository,
the customized repository comprises the customized object,
the original repository comprises an original object,
the customized object is produced by applying one or more customizations to the original object, and
the upgraded repository comprises an upgraded object;
identify the customized object for preservation, wherein
the customized object is preserved, while the enterprise application is upgraded, by retaining the customized object in the merged repository; and
transform the customized object, wherein
the transform enables the customized object to operate with the upgraded enterprise application without reapplying the one or more customizations,
the transform comprises
determining a type of the customized object,
performing a transformational function based on the type,
identifying an updated method in the upgraded object, and
replacing an original method call in the customized object with an updated method call,
the replacing results in the customized object being configured to make a method call to the updated method instead of an original method,
the original method call is a method call to the original method, and
the updated method call is a method call to the updated method.

12. The system of claim 11 wherein the transform is dependent on the customized object being an applet.

13. The system of claim 11 wherein the transform is dependent on the customized object being a view.

14. The system of claim 11 wherein the transform is dependent on the customized object being a screen.

15. The system of claim 11, wherein the computer-executable instructions are further configured to rename an object.

16. The system of claim 11, wherein the computer-executable instructions are further configured to deactivate objects indicated by a user.

17. The system of claim 11, wherein the enterprise application is configured to use objects from multiple repositories.

18. The system of claim 11, wherein the computer-executable instructions are further configured to create a hierarchical data structure relating to categories of objects.

19. A non-transitory computer-readable storage medium comprising computer-executable instructions and a data structure, wherein the computer-executable instructions are configured to:
preserve a customized object while upgrading an enterprise application to an upgraded enterprise application, comprising
a plurality of repositories, wherein
the plurality of repositories comprises
a customized repository,
an original repository, and
an upgraded repository,
the customized repository comprises the customized object,
the original repository comprises an original object,
the customized object is produced by applying one or more customizations to the original object, and
the upgraded repository comprises an upgraded object;
a merge repository, wherein
the merge repository is configured to preserve the customized object, while the enterprise application is upgraded, by retaining the customized object in the merge repository,
the merge repository preserves the customized object by performing a transformation,
the transformation enables the customized object to operate with the upgraded enterprise application without reapplying the one or more customizations,
the transformation results in a transformed customized object,
the transformation comprises
determining a type of the customized object,
performing a transformational function based on the type,
identifying an updated method in the upgraded object, and
replacing an original method call in the customized object with an updated method call,
the replacing results in the customized object being configured to make a method call to the updated method instead of an original method,
the original method call is a method call to the original method, and
the updated method call is a method call to the updated method; and
a hierarchical data structure configured to allow a categorization of an object.

20. The non-transitory computer-readable storage medium of claim 19, wherein the customized object is an applet.

21. The non-transitory computer-readable storage medium of claim 19, wherein the customized object is a view.

22. The non-transitory computer-readable storage medium of claim 19, wherein the customized object is a screen.

23. The non-transitory computer-readable storage medium of claim 19, wherein the hierarchical data structure comprises categories of objects.

24. A method comprising:
preserving a customized object when upgrading an enterprise application to an upgraded enterprise application, comprising
receiving an indication of the customized object to preserve during the upgrading, wherein
the customized object is preserved, while the enterprise application is upgraded, by retaining the customized object in a merged repository;
merging a plurality of repositories into the merged repository, wherein
the plurality of repositories comprises
a customized repository,
an original repository, and
an upgraded repository,
the customized repository comprises the customized object,
the original repository comprises an original object,
the customized object is produced by applying one or more customizations to the original object, and
the upgraded repository comprises an upgraded object;
copying the customized object into the merged repository; and
transforming the customized object, wherein the transforming enables the customized object to operate with the upgraded enterprise application without reapplying the one or more customizations, the transforming comprises determining a type of the customized object, performing a transformational function based on the type, identifying an updated method in the upgraded object, and replacing an original method call in the customized object with an updated method call, the replacing results in the customized object being configured to make a method call to the updated method instead of an original method, the original method call is a method call to the original method, and the updated method call is a method call to the updated method.

25. The method of claim 24, wherein the transforming comprises:

identifying and resolving issues relating to the transformation.

26. The method of claim 25, wherein the type is an applet.

27. The method of claim 26, wherein the transformational function enables the applet to function in a grid.

28. The method of claim 25, wherein the type is a view.

29. The method of claim 28, wherein the transformational function creates a categorization for views.

30. The method of claim 25, wherein the type is a screen.

31. A method comprising:

preserving a customized object while upgrading an enterprise application to an upgraded enterprise application, comprising merging a plurality of repositories into a merged repository, wherein the plurality of repositories comprises a customized repository, an original repository, and an upgraded repository, the customized repository comprises the customized object, the original repository comprises an original object, the customized object is produced by applying one or more customizations to the original object, and the upgraded repository comprises an upgraded object;

identifying the customized object for preservation, wherein the customized object is preserved, while the enterprise application is upgraded, by retaining the customized object in the merged repository;

deactivating the customized object;

creating a copy of the customized object in the merged repository; and transforming the customized object, wherein the transforming enables the customized object to operate with the upgraded enterprise application without reapplying the one or more customizations, the transforming comprises determining a type of the customized object, performing a transformational function based on the type, identifying an updated method in the upgraded object, and replacing an original method call in the copy of the customized object with an updated method call, the replacing results in the customized object being configured to make a method call to the updated method instead of an original method, the original method call is a method call to the original method, and the updated method call is a method call to the updated method.

32. The method of claim 31, wherein the identifying the customized object comprises analyzing objects in the plurality of repositories.

33. The method of claim 31, wherein the identifying the customized object comprises analyzing objects in the merged repository.

34. The method of claim 31, wherein the transforming comprises:

identifying and resolving issues relating to the transformation.

35. The method of claim 34, wherein the type is an applet.

36. The method of claim 35, wherein the transformational function enables the applet to function in a grid.

37. The method of claim 34, wherein the type is a view.

38. The method of claim 37, wherein the transformational function creates a categorization for views.

39. The method of claim 34, wherein the type is a screen.

40. The method of claim 31, wherein the identifying comprises comparing a present state of an object with a state of the object as delivered by a vendor of the object.

41. The method of claim 1, wherein the customized object, the original object, and the upgraded object correspond to one another.

* * * * *

UNITED STATES PATENT AND TRADEMARK OFFICE
CERTIFICATE OF CORRECTION

PATENT NO. : 8,122,377 B2
APPLICATION NO. : 10/880967
DATED : February 21, 2012
INVENTOR(S) : Jindal et al.

Page 1 of 1

It is certified that error appears in the above-identified patent and that said Letters Patent is hereby corrected as shown below:

In column 4, line 56-57, delete "transformed"repository" and insert -- transformed" repository --, therefor.

In column 5, line 13-14, delete "transformed"repository" and insert -- transformed" repository --, therefor.

Signed and Sealed this
Eighth Day of May, 2012

David J. Kappos
*Director of the United States Patent and Trademark Office*